United States Patent [19]

Maltby, Jr. et al.

[11] Patent Number: 5,762,674
[45] Date of Patent: Jun. 9, 1998

[54] APPARATUS FOR COATING GLASS SHEET RIBBON

[75] Inventors: Robert J. Maltby, Jr., Wayne; Michael J. Vild, Toledo; Kenneth H. Wetmore, Perrysburg, all of Ohio

[73] Assignee: Glasstech, Inc., Perrysburg, Ohio

[21] Appl. No.: 534,404

[22] Filed: Sep. 27, 1995

[51] Int. Cl.$^6$ .......... C03C 17/00; C03C 25/02; C03B 18/00; C03B 18/02
[52] U.S. Cl. .......... 65/60.1; 65/182.2; 65/991; 65/99.2; 65/193
[58] Field of Search .......... 65/182.1, 182.2, 65/182.3, 193, 99.1, 99.2, 60.1

[56] References Cited

U.S. PATENT DOCUMENTS

| | | |
|---|---|---|
| 3,300,291 | 1/1967 | Misson . |
| 3,506,422 | 4/1970 | Walters . |
| 3,885,943 | 5/1975 | Chui . |
| 3,930,825 | 1/1976 | Chui . |
| 4,081,260 | 3/1978 | Glikman et al. . |
| 4,088,471 | 5/1978 | Kirkbride et al. .......... 65/182 R |
| 4,548,636 | 10/1985 | Nomaki et al. . |
| 4,578,103 | 3/1986 | Fackelman . |
| 4,615,724 | 10/1986 | Fackelman . |
| 4,749,400 | 6/1988 | Mouly et al. . |
| 5,002,599 | 3/1991 | McMaster et al. . |
| 5,078,775 | 1/1992 | Maltby, Jr. et al. . |
| 5,090,987 | 2/1992 | Maltby, Jr. . |
| 5,156,664 | 10/1992 | Maltby, Jr. et al. . |
| 5,209,767 | 5/1993 | Maltby, Jr. et al. . |
| 5,256,485 | 10/1993 | Terneu et al. .......... 428/426 |

Primary Examiner—Donald E. Czaja
Assistant Examiner—Jacqueline A. Ruller
Attorney, Agent, or Firm—Brooks & Kushman P.C.

[57] ABSTRACT

Forming apparatus (22) and a method for forming a glass sheet ribbon G delivered from a float tank (44) to a topside support device (74) having a downwardly facing surface to which a vacuum and pressurized gas are supplied to support the glass sheet ribbon (G) at its upper surface (52) while a coater (78) applies a coating (80) to its lower surface (54). Another coater (86) applies a coating (88) to the upper surface (52) of the glass sheet ribbon G. A coated glass sheet (32) cut from the glass sheet ribbon G has at least one surface, and as disclosed both of its surfaces (52,54), coated so as to be protected from deterioration caused by exposure to the atmosphere.

6 Claims, 3 Drawing Sheets

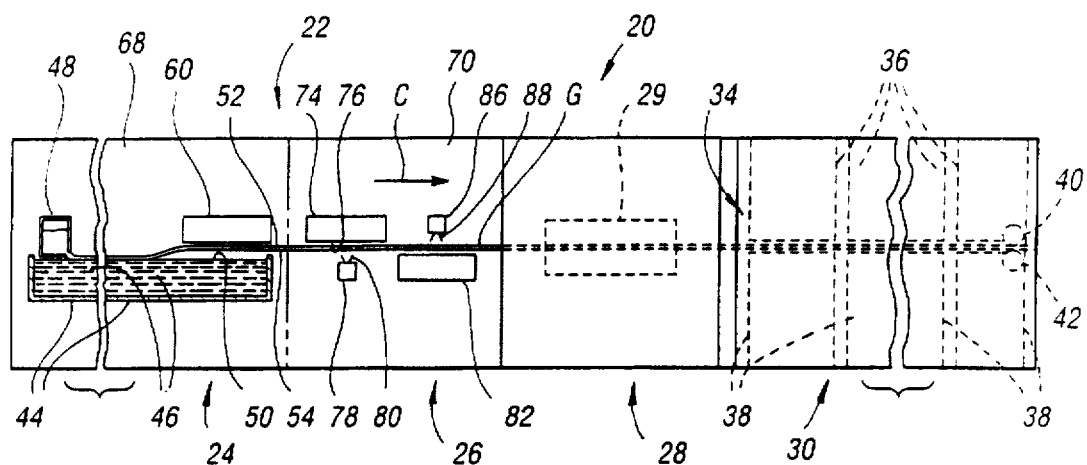
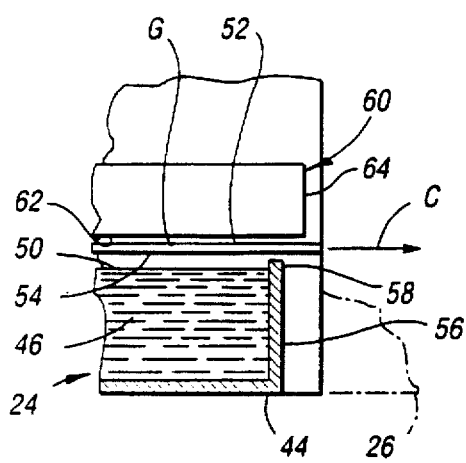
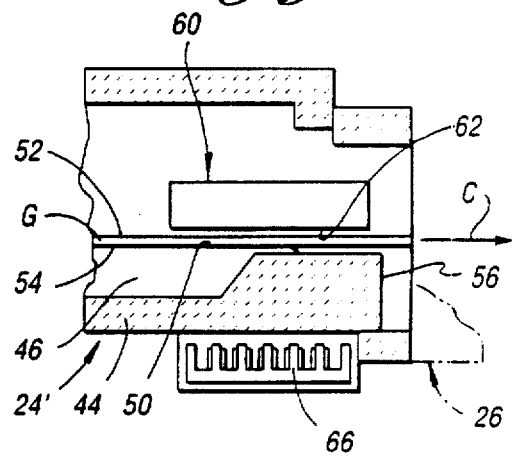
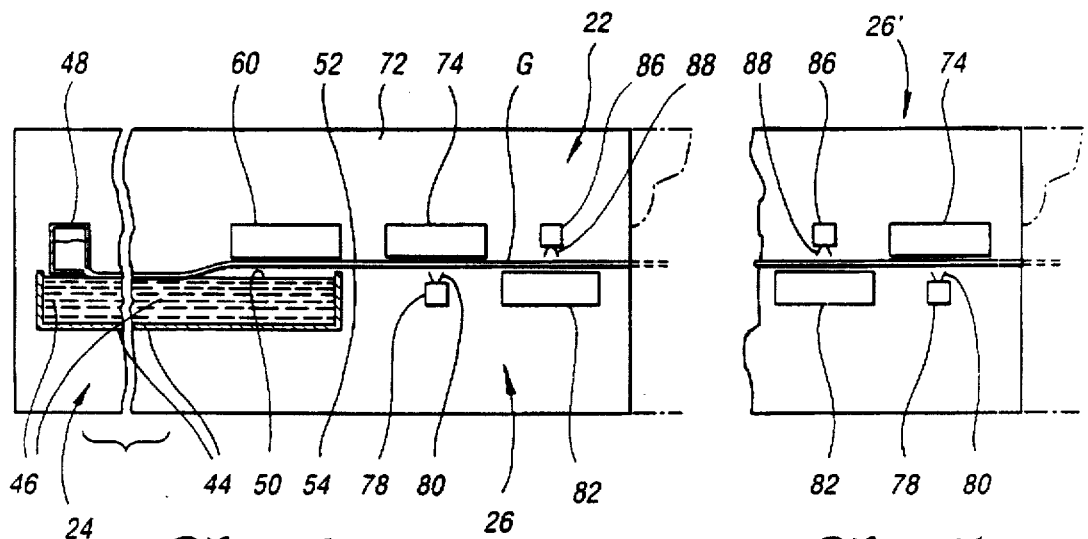

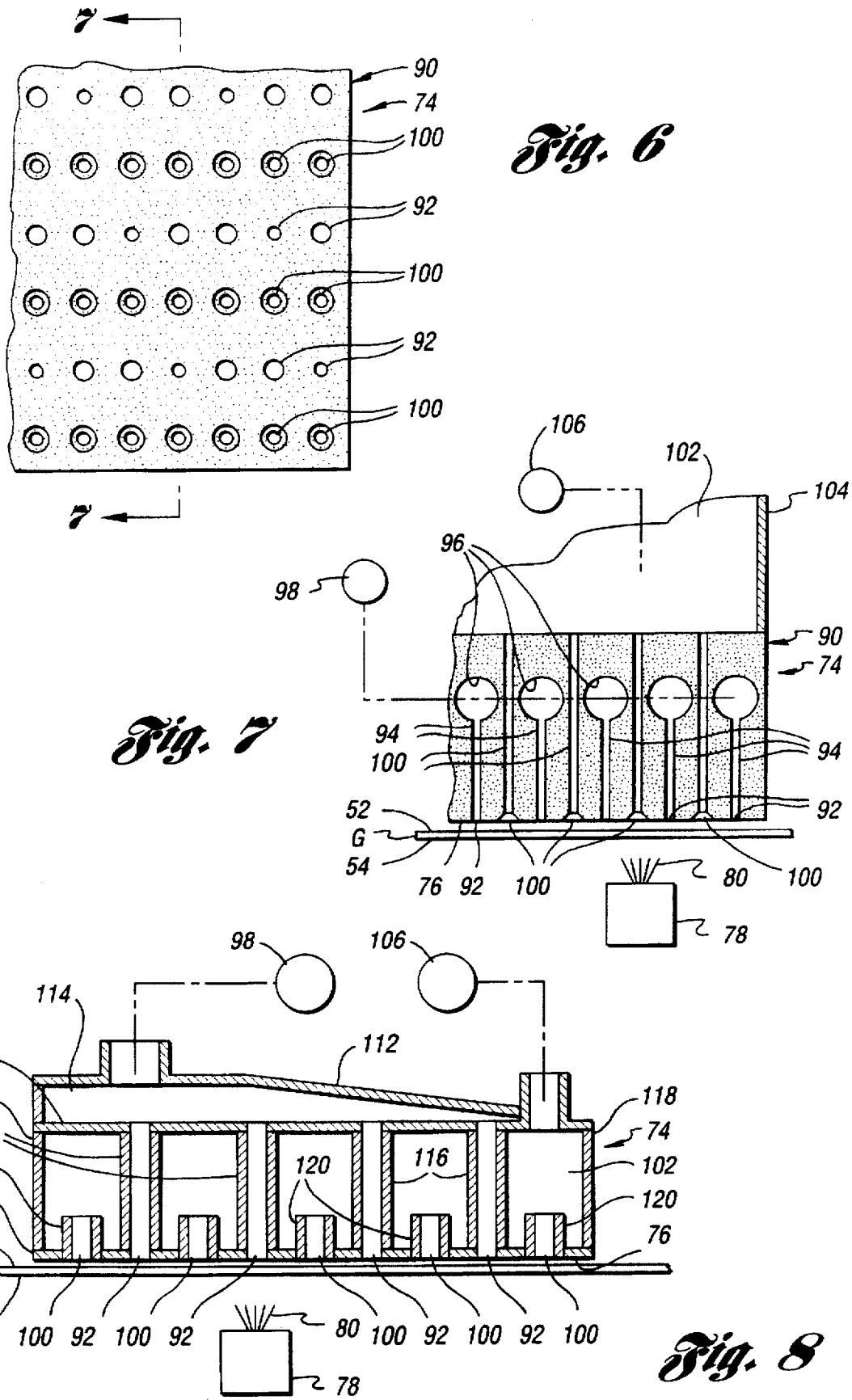

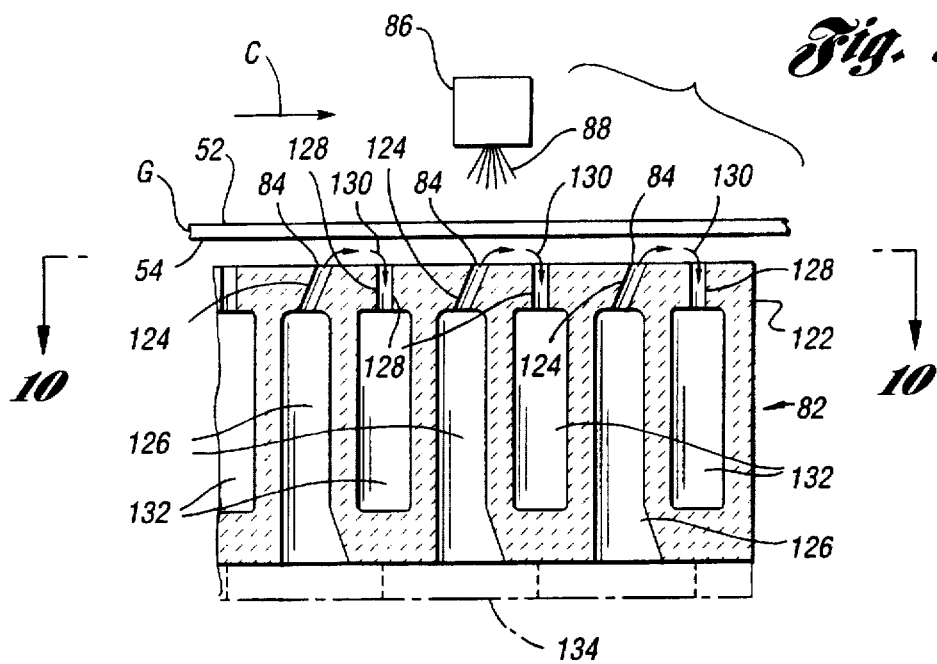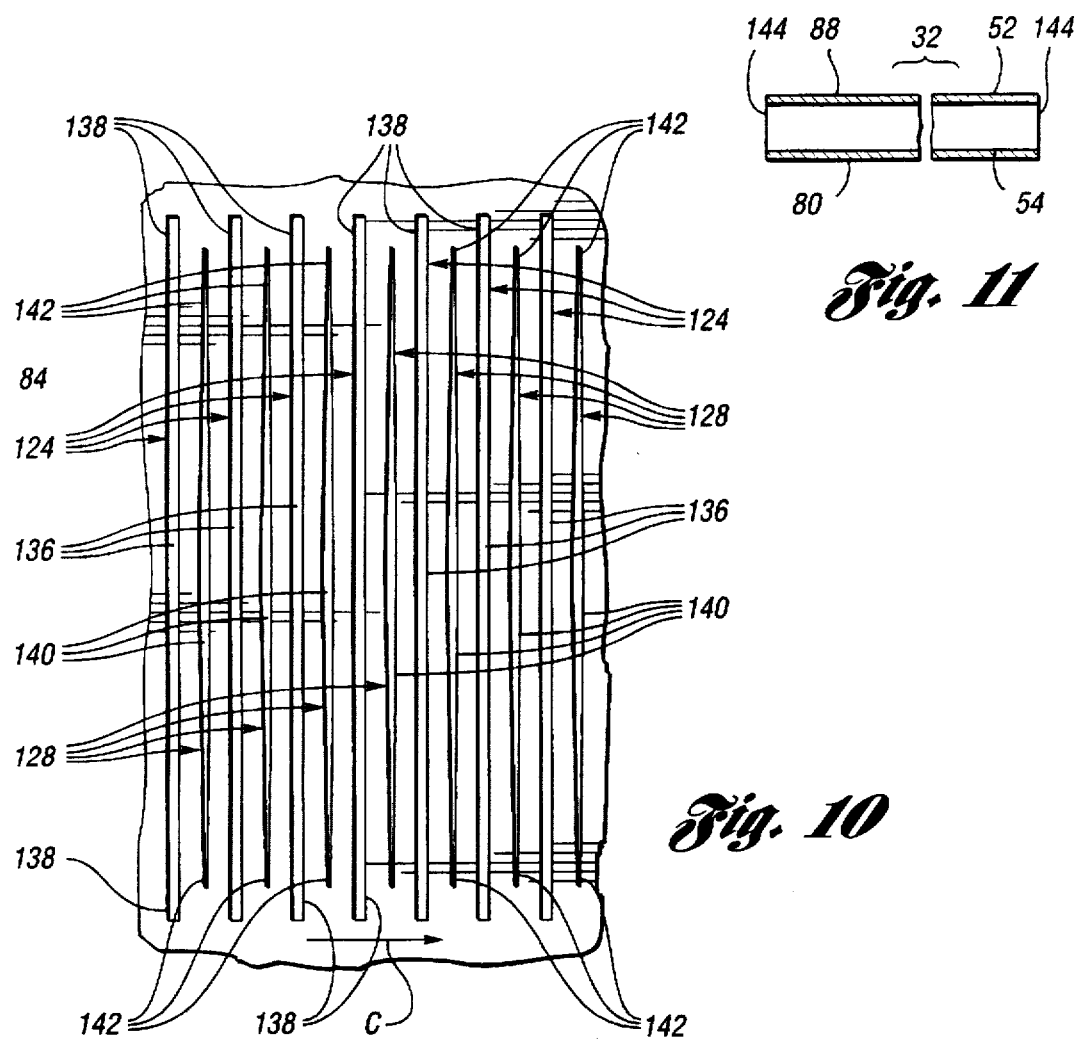

APPARATUS FOR COATING GLASS SHEET RIBBON

TECHNICAL FIELD

This invention relates to apparatus and a method for coating a glass sheet ribbon and also relates to the resultant coated glass sheet cut from the ribbon.

BACKGROUND ART

Glass sheets are conventionally formed in discrete lengths by cutting from an annealed glass sheet ribbon. Such glass sheet ribbons are conventionally formed on a bath of molten metal which to date has always been tin since it is necessary for the bath to be molten throughout a temperature range of 1000° to 20000° Fahrenheit as well as having a specific gravity that is greater than glass and, to date, tin is the only material that satisfies such requirements. After forming of the glass sheet ribbon, its upper surface has been previously been coated normally with a tin oxide coating applied by pyrolysis. Pyrolytic coating of semi-conductor materials can also be applied to the upper surface of glass sheet ribbons.

DISCLOSURE OF THE INVENTION

One object of the invention is to provide improved apparatus for forming a glass sheet ribbon with a coating.

In carrying out the above object, the glass sheet ribbon forming apparatus constructed in accordance with the present invention includes a float tank for receiving a bath of molten metal on which a newly formed glass sheet ribbon is floated and conveyed along a generally horizontal direction of conveyance for delivery from the float tank in a generally horizontal direction with upper and lower surfaces thereof respectively facing upwardly and downwardly. A topside support device of the apparatus has a downwardly facing surface to which a vacuum and pressurized gas are supplied to support the glass sheet ribbon from above at the upper surface thereof downstream from the float tank. A coater of the apparatus applies a coating to the lower surface of the glass sheet ribbon while the upper surface thereof is supported by the topside support device.

In the preferred construction of the glass sheet ribbon forming apparatus, the coater is located directly below the topside support device.

The preferred construction of the glass sheet ribbon forming apparatus also includes a conveyor that supports the glass sheet ribbon from below at a location spaced from the topside support device along the direction of conveyance, and a second coater of the apparatus applies a coating to the upper surface of the glass sheet ribbon while supported from below by the conveyor. This conveyor is preferably a gas hearth conveyor for supplying an upward gas flow that supports the glass sheet ribbon from below. Furthermore, the second coater is preferably located directly above the gas hearth conveyor.

Another object of the present invention is to provide an improved method for forming a glass sheet ribbon with a coating.

In carrying out the above object, the method for forming a glass sheet ribbon is performed by delivering a newly formed glass sheet ribbon from a molten metal float tank along a direction of conveyance in a horizontal direction with upper and lower surfaces thereof respectively facing upwardly and downwardly. The glass sheet ribbon is supported downstream from the float tank by a vacuum and pressurized gas supplied to the upper surface of the ribbon without any direct mechanical contact with the ribbon. A coating is applied to the lower surface of the glass sheet ribbon while the upper surface thereof is supported by the vacuum and pressurized gas.

In the preferred practice of the method, the coating is applied to the lower surface of the glass sheet ribbon directly below the location where the vacuum and pressurized gas supports its upper surface.

The preferred practice of the method also supports the glass sheet ribbon from below at its lower surface at a location spaced along the direction of conveyance from the location where the vacuum and pressurized gas supports its upper surface. A second coating is applied to the surface of the glass sheet ribbon while supported from below. The glass sheet ribbon is preferably supported from below at its lower surface by an upward gas flow. The second coating is referably applied to the upper surface of the glass sheet ribbon directly above the location where the upward gas flow supports its lower surface.

Another object of the present invention is to provide an improved coated glass sheet.

In carrying out the above object, a coated glass sheet according to the present invention includes a discrete glass sheet having oppositely facing surfaces one of which is a float surface having a coating applied thereto within an inert atmosphere immediately after forming of a glass sheet ribbon floated on a bath of molten metal prior at any mechanical contact therewith and while supported from above by a vacuum and pressurized gas prior to annealing and cutting of the ribbon into the discrete glass sheet.

In the preferred construction of the coated glass sheet, the other surface of the discrete glass sheet also has a coating applied thereto within the inert atmosphere immediately after the float forming of the glass sheet ribbon on the bath of molten metal prior to any mechanical contact therewith and while supported from below by upward gas flow prior to the annealing and cutting of the ribbon into the discrete glass sheet.

The preferred construction of the coated glass sheet has the float surface of the discrete glass sheet provided with a pyrolytic coating, and the other surface of the discrete glass sheet also has a pyrolytic coating.

The objects, features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, partially broken away side elevational view of a glass sheet forming system including apparatus constructed according to the invention to perform the method thereof for forming a coated glass sheet ribbon that can be cut to length as coated glass sheets according to the invention;

FIG. 2 is a partial view of one embodiment of a forming station for delivering a glass sheet ribbon from a molten metal bath of a forming station prior to conveyance to a coating station;

FIG. 3 is a partial view similar to FIG. 2 of another embodiment of the forming station for delivering the glass sheet ribbon from the molten metal bath of the forming station;

FIG. 4 is a schematic, partial view similar to FIG. 1 wherein the forming station and the coating station are located within the same inert gas chamber as each other as opposed to different inert gas chambers;

FIG. 5 is a schematic, partial view of the system taken in the same direction as FIG. 1 illustrating the coating station wherein the lower glass sheet ribbon surface is disclosed as being coated after the upper surface instead of before the upper surface;

FIG. 6 is a bottom plan view of a topside support device of the apparatus to illustrate a downwardly facing surface thereof where vacuum and pressurized gas are respectively supplied to first and second sets of holes to support the glass sheet ribbon from above without any direct contact during coating of its lower surface;

FIG. 7 is a sectional view taken along the direction of line 7—7 in FIG. 6 to illustrate the construction of the topside support device which is illustrated as being made of sinter bonded fused silica particles and having passages for providing the first and second sets of vacuum and pressurized gas holes;

FIG. 8 is a view similar to FIG. 7 of another embodiment of the topside support device which is fabricated from metal;

FIG. 9 is a sectional view taken in the same direction as FIG. 1 through a gas hearth conveyor that supports the glass sheet ribbon during coating of its upper surface;

FIG. 10 is a top plan view of the gas hearth taken along the direction of line 10—10 in FIG. 9; and FIG. 11 is a broken away view of a coated glass sheet cut from a glass sheet ribbon that is formed and coated by the apparatus and method of the invention.

BEST MODES FOR CARRYING OUT THE INVENTION

With reference to FIG. 1 of the drawings, a coated glass sheet forming system generally indicated by 20 includes glass sheet ribbon forming apparatus 22 constructed in accordance with the present invention to perform the method thereof as is hereinafter more fully described. This forming apparatus 22 includes a forming station 24 for forming a glass sheet ribbon G that is conveyed along a direction of conveyance illustrated by arrow C through the coating station for coating as is hereinafter more fully described. System 20 includes an edge cutting station 28 through which the glass sheet ribbon G is conveyed. This edge cutting station has cutting apparatus 29 for trimming of the edges of the glass sheet ribbon G while still in its hot condition from the forming station 24 with this edge cutting being performed in any conventional manner such as disclosed by U.S. Pat. No. 4,749,400 Mouley et al.

Downstream from the edge cutting station 28, system 20 includes an annealing lehr 30 which has a decreasing temperature gradient from the left toward the right so as to slowly cool and thus anneal the glass sheet ribbon G such that it can subsequently be cut to provide coated glass sheets of discrete lengths as illustrated by 32 in FIG. 11. This annealing lehr 30 is preferably constructed as disclosed by U.S. Pat. No. 5,209,767 Maltby, Jr. et al to include a gas hearth conveyor 34 having upper and lower gas manifolds 36 and 38 that supply heated gas to the upper and lower surfaces of the glass sheet ribbon G with a decreasing gas temperature from the left toward the right. This gas hearth conveyor 22 provides the sole support as well as the cooling of the glass sheet ribbon G as it moves along the direction of conveyance illustrated by arrow C. Upper and lower drive rolls 40 and 42 respectively engage the upper and lower surfaces of the glass sheet ribbon G at a location where the glass sheet has already cooled below the strain point so as to harden and most preferably cooled sufficiently such that the surfaces of the ribbon are in compression so as to thereby prevent any deterioration of the glass quality by the driving engagement of the drive rolls with the glass surfaces. These drive rolls 40 and 42 thus pull the glass sheet ribbon G through the system 20 and after exiting the annealing lehr 30, the ribbon can be cut in any conventional manner to provide the coated glass sheet 32 illustrated in FIG. 11.

The glass sheet ribbon forming apparatus 22 of the present invention will be described in an integrated manner with the method of the invention to facilitate an understanding of the manner in which the glass sheet ribbon G is formed and coated. This apparatus 22 includes a float tank 44 for receiving a bath of molten metal 46 on which a newly formed glass sheet ribbon G is floated and conveyed along a generally horizontal direction of conveyance as illustrated by arrow C. Any conventional type glass melter 48 provides the glass sheet ribbon G to the upper surface 50 of the bath of molten metal 46 so as to float thereon and be formed as a glass sheet under the force of gravity and a pulling action from the left toward the right by conventional nipper rolls which are not illustrated. The glass sheet ribbon G is delivered from the float tank 44 of the forming station 24 to the coating station 26 in a generally horizontal direction with upper and lower surfaces 52 and 54 thereof respectively facing upwardly and downwardly.

Any conventional type of molten metal float tank forming can be utilized upstream from the coating station 26 such as the types illustrated in U.S. Pat. Nos. 3,300,291 Misson, 3,885,943 Chui and 3,930,825 Chui wherein a take-out roller initially engages the lower surface of the glass sheet ribbon after exiting the float tank or as disclosed by U.S. Pat. No. 3,506,422 Walters wherein a gas hearth engages the glass sheet ribbon after exiting the float tank. However, it is preferable for the forming station to have the float tank 44 constructed as described below in connection with FIGS. 2 or 3 to facilitate the delivery without any direct mechanical engagement with the glass sheet ribbon. Mechanical engagement with the hot glass sheet ribbon such as by a conventional take-out roll can cause small cracks that adversely affect the glass strength as is hereinafter more fully described.

As illustrated in FIG. 2, one embodiment of the forming station 24 has its float tank 44 provided with a delivery end 56 having an upper lip 58 that extends above the upper surface 50 of the bath of molten metal 46 on which the glass sheet ribbon G is floated during the forming. A topside support device 60 of this embodiment of the forming station has a downwardly facing surface 62 to which vacuum and pressurized gas are supplied through either a fused silica block construction as illustrated by U.S. Pat. Nos. 4,578,103 Fackleman and 4,615,724 Fackleman or a fabricated metal construction as illustrated by U.S. Pat. No. 5,002,599 McMaster et al. This vacuum and pressurized gas supplied to the downwardly facing surface 62 is applied to the upwardly facing surface 52 of the glass sheet ribbon G to support the ribbon above the upper lip 58 of the delivery end 56 of float tank 44 so that the ribbon can be delivered toward the right to the coating station 26. This construction thus enables the bath of molten metal 46 to be confined by the float tank upper lip 58 while still delivering the glass sheet ribbon G over the upper lip without any mechanical contact with the lower ribbon surface 54.

Different constructions of the downwardly facing surface 62 of the topside support device 60 shown in FIG. 2 can be provided, including: (1) a horizontally extending shape that extends at a constant elevation toward the left from its delivery end 64; (2) a horizontally extending shape that extends from the delivery end 64 toward the left and then downwardly in an inclined orientation that facilitates the lifting of the glass sheet ribbon G from the upper surface 50 of the bath of molten metal 46; and (3) a curved shape that extends horizontally and downwardly from the delivery end 64 with an upwardly concave curved shape that facilitates the lifting of the glass sheet ribbon G From the upper surface 50 of the bath of molten metal 46.

With reference to FIG. 3, another embodiment of the forming station 24' is similar to the embodiment of FIG. 2 except that its delivery end 56 does not extend above the upper surface 50 of the bath of molten metal 46. Rather, this embodiment of the forming station 24' has its delivery end 56 provided with a linear induction motor 66 such as disclosed by U.S. Pat. Nos. 4,081,260 Glikman et al, 4,548,636 Nomaki et al, 5,090,987 Maltby, Jr. and 5,156,664 Maltby, Jr. et al. This linear induction motor 66 acts against the force of gravity to prevent the bath of molten metal 46 from moving toward the right for flow out of the float tank 44 such that the glass sheet ribbon G can be delivered toward the right to the coating station 26 with only a horizontal component of movement along the direction of conveyance shown by arrow C. This delivery can be assisted as illustrated in the aforementioned U.S. Pat. No. 5,156,664 Maltby, Jr. et al by provision of a topside support device 60 whose downwardly facing surface 62 extends only horizontally and has vacuum and pressurized gas supplied thereto to support the glass sheet ribbon G at its upper surface 52 for the delivery from the left toward the right as shown by the direction of conveyance illustrated by arrow C.

As illustrated in FIG. 1, the forming station 24 is located within a chamber 68 containing a pressurized inert atmosphere which will normally be nitrogen. Furthermore, the coating station 26 is located within a chamber 70 that contains a pressurized inert atmosphere such as nitrogen so that the coating can be performed before any water vapor contacts the glass sheet ribbon surfaces in a manner that can significantly diminish the glass strength by penetrating into the glass and introducing small cracks. Forming the glass sheet ribbon and surface coating thereof within an inert atmosphere prevents such problems. Also, it should be appreciated that whereas separate chambers 68 and 70 are utilized for the glass sheet ribbon forming and coating as illustrated in FIG. 1, it is also possible for the forming and coating to be performed as illustrated in FIG. 4 within the same chamber 72 in which a pressurized inert atmosphere such as nitrogen is contained.

With reference to FIGS. 1, 6 and 7, the glass sheet ribbon forming apparatus of the invention includes a topside support device 74 having a downwardly facing surface 76 to which a vacuum and pressurized gas are supplied to support the glass sheet ribbon G from above at its upper surface 52 downstream from the float tank 44 illustrated in FIG. 1. A first coater 78 of the apparatus provides a coating 80 to the lower surface 54 of the glass sheet ribbon G while the upper surface 52 thereof is supported by the topside support device 74.

With continuing reference to FIGS. 1, 6 and 7, the coater 78 is preferably located directly below the topside support device 74 which supports the upper surface 52 of the glass sheet ribbon G while permitting the coating of its lower surface 54.

With reference to FIGS. 1 and 8, the coating station 26 of the glass sheet ribbon forming apparatus also includes a conveyor 82 that supports the glass sheet ribbon G from below at a location spaced as shown in FIG. 1 from the topside support device 74 along the direction of conveyance illustrated by arrow C. In the preferred construction shown, the conveyor 82 is a gas hearth conveyor that supplies an upward gas flow 84 that supports the glass sheet ribbon G from below at its lower surface 54. A second coater 86 of the coating station 26 applies a coating 88 to the upper surface 52 of the glass sheet ribbon while supported from below, which support is provided by the upward gas flow 84 in the preferred construction shown.

As shown in both FIGS. 1 and 8, the second coater 86 is located directly above the gas hearth conveyor 82 which provides the upward gas flow 84 (FIG. 8) for supporting the glass sheet ribbon G.

With reference to FIGS. 1 and 5, the embodiment of the coating station 26 shown in FIG. 1 has the first coater 78 located upstream from the second coater 86 to initially apply the coating 80 to the lower surface 54 of the glass sheet ribbon before the second coating 88 is applied to the upper surface 52 of the ribbon, while the embodiment of the coating station 26' shown in FIG. 5 has the first coater 78 located downstream from the second coater 86 to apply the coating 80 to the lower surface 54 of the glass sheet ribbon G after the second coater 86 has applied the coating 88 to the upper surface 52 of the ribbon.

It should be appreciated that for some applications, it is only necessary to coat one surface of the glass sheet ribbon G such that the second coating operation of its upper surface 52 is not necessary in those cases. Also, while a gas hearth conveyor is desirable for supporting the glass sheet ribbon from below after the coating of its lower surface since this does not involve any direct mechanical contact with the coated lower surface, some applications can utilize other conveyors that do directly contact the coated lower surface, such as roll conveyors of any conventional type. Likewise, when utilizing the direct contact type of lower support of the coated lower surface of the glass sheet ribbon G, the upper surface 52 may be coated by the second coater or not as required by the particular application.

As illustrated in FIGS. 5 and 6, the topside support device 74 is constructed as a refractory block 90 made from fused silica particles that are sinter bonded such that the block has a low coefficient of thermal expansion and hence the ability to maintain its shape without thermal warpage when heated and cooled. This refractory block 90 includes a first set of holes 92 through which a vacuum is supplied to the downwardly facing surface 76 from passages 94 that are communicated with vacuum conduits 96 in which a vacuum is drawn by a vacuum source 98. The refractory block 90 also includes a second set of holes 100 through which pressurized gas is supplied to the downwardly facing surfaces from passages 100 that extend from the downwardly facing surface 76 through the block to its upper side where a plenum 102 is provided by a housing 104 that is connected to a suitable source 106 of pressurized gas. Such a construction of the topside support device 74 is disclosed by U.S. Pat. Nos. 4,578,103 Fackleman and 4,615,724 Fackleman.

With reference to FIG. 7, the topside support device 74 can also be constructed from fabricated metal such as disclosed by U.S. Pat. No. 5,002,599 McMaster et al. More specifically, this construction of the topside support device 74 has a lower plate 108 that defines the first set of vacuum holes 92 and the second set of pressurized gas holes 100. An upper plate 110 of this embodiment of the topside support device cooperates with a housing 112 to define a vacuum chamber 114 that is communicated with the source of vacuum 98. Conduits 116 extend between the lower and upper plates 108 and 110 to communicate the vacuum chamber 114 with the first set of vacuum holes 92. Side walls 118 cooperate with the lower and upper plates 108 and 110 to define a plenum 102 that is communicated with the pressurized gas source 106 for flow of pressurized gas to the second set of pressurized gas holes 100. These pressurized gas holes 100 are preferably provided with roll pins 120 that facilitate the flow to the holes 100 and eliminate entrance effects.

With reference to FIGS. 8 and 9, the gas hearth conveyor 82 is illustrated as having the construction disclosed by U.S. Pat. No. 5,078,775 Maltby, Jr. et al, which includes a molded refractory block 122 cast from sinter bonded fused silica particles so as to have good resistance to thermal warpage when heated and cooled in the same way as the embodiment of the topside support device 74 shown in FIGS. 5 and 6. This refractory block 122 has supply openings 124 that are fed pressurized heated gas from plenum passages 126 and that are inclined along the direction of conveyance shown by arrow C such that the upward gas flow 84 also assists in moving the glass sheet ribbon G. Gas hearth conveyor 82 also includes exhaust openings 128 through which the spent gas flow after impinging with the lower ribbon surface 54 is exhausted downwardly as shown by arrows 130 for flow to exhaust passages 132. A schematically indicated manifold 134 communicates with the plenum chambers 126 and the exhaust chambers 132 to provide a recirculating flow of heated gas in any suitable manner such as disclosed by U.S. Pat. Nos. 5,078,775 Maltby, Jr. et al and 5,209,767 Maltby, Jr. et al.

As illustrated in FIG. 9, each supply opening 124 of the gas hearth conveyor 82 has an elongated slit shape that extends transverse to the direction of conveyance shown by arrow C and has a generally straight shape provided by an intermediate portion 136 extending between its ends 138. The exhaust openings 128 alternate with the supply openings 124 and have an elongated slit shapes extending parallel to the supply openings transverse to the direction of conveyance shown by arrow C. These exhaust openings 128 have intermediate portions 140 extending between their opposite ends 142 and the intermediate portions thereof have greater gas flow areas that progressively increase in opposite directions from their ends toward a central location between the ends. More specifically, as illustrated, the greater flow area in the illustrated embodiment is provided by a greater width of each slit type exhaust opening 128 at their intermediate portions 140 as compared to their ends 142. This greater exhaust area at the central location of the exhaust openings 128 causes the exhaust gas to flow toward the center of the hearth in a manner that tends to center the glass sheet ribbon G being conveyed during the processing.

With reference to FIG. 11, the coated glass sheet 32 has opposite ends 144 that are cut after passage through the annealing leer 30 illustrated in FIG. 1. The lower surface 54 has the coating 80 as previously described while the upper surface 52 has the coating 88 as was also previously described. Both of these coatings are applied prior to exiting of the glass sheet ribbon from the inert atmosphere such that the glass sheet 32 has enhanced strength. While different types of coatings can be utilized, pyrolytic coatings applied by pyrolysis in a heated environment of the coating chamber 26 shown in FIG. 1 are most effective and normally will be metallic coatings such as tin oxide. However, as previously mentioned, the coatings can also be of semi-conductor materials such as are utilized in photovoltaics and other applications. It should be noted that the lower surface 54 is a float surface having previously been floated on the molten metal provided by the tin. Some minute amounts of the tin will remain on the float surface 54 such that it has a slightly different composition from the upper surface 52 that does not contact the tin.

While the best modes for carrying out the invention have been described in detail, those familiar with the art to which this invention relates will recognize various alternative ways of practicing the invention as defined by the following claims.

What is claimed is:

1. Glass sheet ribbon forming apparatus, comprising:

a float tank for receiving a bath of molten metal on which a newly formed glass sheet ribbon is floated and conveyed along a generally horizontal direction of conveyance for delivery from the float tank in a generally horizontal direction with upper and lower surfaces thereof respectively facing upwardly and downwardly;

a topside support device having a downwardly facing surface to which a vacuum and pressurized gas are supplied to support the glass sheet ribbon from above at the upper surface thereof downstream from the float tank; and a coater for applying a coating to the lower surface of the glass sheet ribbon while the upper surface thereof is supported by the topside support device.

2. Glass sheet ribbon forming apparatus as in claim 1 wherein the coater is located directly below the topside support device.

3. Glass sheet ribbon forming apparatus as in claim 1 further including a conveyor that supports the glass sheet ribbon from below at a location spaced from the topside support device along the direction of conveyance, and a second coater for applying a coating to the upper surface of the glass sheet ribbon while supported from below by the conveyor.

4. Glass sheet ribbon forming apparatus as in claim 3 wherein the conveyor is a gas hearth conveyor for supplying an upward gas flow that supports the glass sheet ribbon from below.

5. Glass sheet ribbon forming apparatus as in claim 4 wherein the second coater is located directly above the gas hearth conveyor.

6. Glass sheet ribbon forming apparatus, comprising:

a float tank for receiving a bath of molten metal on which a newly formed glass sheet ribbon is floated and conveyed along a generally horizontal direction of conveyance for delivery from the float tank in a generally horizontal direction with upper and lower surfaces thereof respectively facing upwardly and downwardly;

a topside support device having a downwardly facing surface to which a vacuum and pressurized gas are supplied to support the glass sheet ribbon from above at the upper surface thereof downstream from the float tank;

a first coater that is located directly below the topside support device and that applies a coating to the lower surface of the glass sheet ribbon while the upper surface thereof is supported by the topside support device;

a gas hearth conveyor for supplying an upward gas flow that supports the glass sheet ribbon from below at a location spaced from the topside support device along the direction of conveyance; and a second coater that is located directly above the gas hearth and that applies a coating to the upper surface of the glass sheet ribbon while supported from below by the gas hearth conveyor.

* * * * *

UNITED STATES PATENT AND TRADEMARK OFFICE
CERTIFICATE OF CORRECTION

PATENT NO : 5,762,674
DATED : June 9, 1998
INVENTOR(S) : Robert E. Maltby, Jr.; Michael J. Vild & Kenneth H. Wetmore It is certified that error appears in the above-identified patent and that said Letters Patent is hereby corrected as shown below:

TITLE PAGE, ITEM [75]:

Change the identification of the first named inventor to --Robert E. Maltby, Jr.--

Signed and Sealed this

Twenty-eighth Day of September, 1999

Q. TODD DICKINSON

*Attest:*

*Attesting Officer*     *Acting Commissioner of Patents and Trademarks*